United States Patent
Benda

(10) Patent No.: US 6,849,018 B2
(45) Date of Patent: Feb. 1, 2005

(54) ACTUATOR FOR AN AUTOMATIC TRANSMISSION PROVIDED WITH ELECTRICAL ACTUATION

(75) Inventor: Thomas Benda, Einbeck (DE)

(73) Assignee: United Parts FHS Automobil Systeme GmbH, Dassel (DE)

(*) Notice: Subject to any disclaimer, the term of this patent is extended or adjusted under 35 U.S.C. 154(b) by 80 days.

(21) Appl. No.: 10/285,207

(22) Filed: Oct. 31, 2002

(65) Prior Publication Data
US 2003/0066369 A1 Apr. 10, 2003

Related U.S. Application Data

(62) Division of application No. 09/662,574, filed on Sep. 15, 2000.

(51) Int. Cl.[7] ............................................. F16H 59/08
(52) U.S. Cl. .................................... 475/132; 74/473.12
(58) Field of Search .............................. 475/131, 132; 74/473.1, 473.11, 473.12, 473.3, 335

(56) References Cited

U.S. PATENT DOCUMENTS

| 3,732,753 A | | 5/1973 | Olsen et al. |
|---|---|---|---|
| 4,580,457 A | * | 4/1986 | Ishida et al. .................. 74/335 |
| 4,683,768 A | | 8/1987 | Budinski |
| 4,790,204 A | | 12/1988 | Tury et al. |
| 5,653,143 A | * | 8/1997 | Langevin ..................... 74/348 |
| 5,827,149 A | | 10/1998 | Sponable |
| 5,907,885 A | | 6/1999 | Tilli et al. |
| 6,016,049 A | * | 1/2000 | Baughman et al. ......... 320/167 |
| 6,098,482 A | * | 8/2000 | Ishii et al. ............... 74/473.11 |
| 6,161,447 A | | 12/2000 | Worner et al. |
| 6,230,576 B1 | | 5/2001 | Yamada et al. |
| 6,354,422 B1 | | 3/2002 | Kim |

FOREIGN PATENT DOCUMENTS

DE 43 04 250 6/1994

OTHER PUBLICATIONS

Article entitled "PKW–Automatengetriebe" Verlag Moderne Industrie Ag. Landsberg/Lech 1994, pp. 24, 25.

* cited by examiner

Primary Examiner—Sherry Estremsky
(74) Attorney, Agent, or Firm—Cohen, Pontani, Lieberman & Pavane

(57) ABSTRACT

An electrical actuation for an automatic transmission, preferably for selection actuation in automobiles in which a four-bar linkage transmission and a worm gear unit are arranged between the electric drive and the transmission. Shifting can be carried out with a low-output drive, particularly in the parked shifting position "P", also when very large forces are required such as those occurring when the vehicle is parked on a hill.

5 Claims, 2 Drawing Sheets

ACTUATOR FOR AN AUTOMATIC TRANSMISSION PROVIDED WITH ELECTRICAL ACTUATION

CROSS-REFERENCE TO RELATED APPLICATION(S)

This application is a Divisional of U.S. patent application Ser. No. 09/662,574, filed Sep. 15, 2000.

BACKGROUND OF THE INVENTION

1. Field of the Invention

The invention relates to an actuator for an automatic transmission provided with electrical actuation, preferably for automobiles.

The solution according to the invention is suitable for automatic transmissions, especially for automobiles which are often parked on inclined surfaces in the driving direction.

2. Discussion of the Prior Art

The object of the selection actuation in an automobile is to convey the gear setting adjusted by the driver to the transmission. It is possible to do this mechanically or electrically. With electrical selection actuation in the driver's compartment of the vehicle, the selection actuation is only an electric switch or sensor which conveys the gear selected by the driver to the transmission controller. The selection actuation can be constructed as a conventional lever. However, it can also be realized as a rotary switch or by means of push buttons.

The transmission controller contains a microprocessor whose function it is to compare the gear position of the transmission with that of the selection actuation and, in the event of a difference, to control the actuator at the transmission so that the transmission and selection actuation have the same gear speed again.

In addition, the system has a display in the driver's compartment of the vehicle which displays the selected gear speed to the driver.

An automatic transmission has at least gears "P-R-N-D", and can also provide gears "L" or "3, 2, 1".

The use of electrically actuated automatic transmissions is less common, but has been known since the 1970s.

When a vehicle with automatic transmission is parked on a hill, the mechanical locking of the transmission in the "P" gear position is tensioned by the descending force of the inclination. Therefore, a very high expenditure of energy is needed to remove the transmission from the "P" gear position. For vehicles with an electrically actuated automatic transmission, this means that the electric drive in question must be designed with a distinctly high output; however, as a result of this, the drive responds very sluggishly and is very heavy. Moreover, drives of this type occupy a large amount of space and are expensive. When shifting through from one end of the shift gate to the other, the rest of the shift positions of the transmission require only a very weak drive which responds very quickly, since shifting through should take no longer than a few seconds. Further, the positioning of the hydraulic piston of the automatic transmission must be carried out very precisely. A powerful and sluggish drive such as that in large electric motors is unsuitable for these tasks. This statement applies in principle to all drives or actuators.

A catch mechanism arranged in the transmission is used for precise positioning off the hydraulic cylinder, also known as the selector slide. Since the tolerance chain between selection actuation and transmission is too large for precise positioning with mechanical actuation, play is required between the drive and transmission. Otherwise, the exact positioning relative to the catch mechanism would have to be carried out by the actuator.

"PKW-Automatengetriebe", Verlag Moderne Industrie AG, Landsberg/Lech 1994, pp. 24, 25, discloses a parking lock for automatic transmissions in which a detent catches in the parking ratchet wheel in the "P" position of the selector lever. One of the requirements made on this mechanism respecting operation and reliability is that the vehicle is held in forward and reverse also on steep grades and the lock can be disengaged again under these conditions.

This is problematic precisely with steep grades, e.g., garage entrances, with grades of up to 30 percent.

In order to meet these demands, U.S. Pat. No. 5,827,149 A describes an electrically controlled actuating device having two electric motors, wherein one electric motor adjusts the actuating shaft of the transmission and is provided with a rod linkage and the other motor serves to disengage the detent. The disadvantage of this arrangement is that no higher forces can be transmitted via the electric motor, which is a stepper motor. Further, two electric motors are required to disengage the detent and the parking ratchet wheel. This reference does not disclose a gear unit with variable transmission ratio between the drive and the automatic transmission.

SUMMARY OF THE INVENTION

Therefore, it is the object of the invention to eliminate the disadvantages of the prior art and to provide an actuator for an automatic transmission by which very high forces can be transmitted to the automatic transmission on the one hand and in which it is possible, on the other hand, to carry out positioning very precisely and quickly, wherein a drive with low weight and compact dimensioning is to be used.

The actuator according to the invention for electrical actuation for an automatic transmission is characterized in that a four-bar linkage transmission is arranged between its drive and the automatic transmission. This four-bar linkage transmission has a transmission ratio which is not constant and which is used for the purpose of transmitting the torque of the drive of the actuator to the automatic transmission with large force but at a low speed in the "P" position and with small force and a higher speed in the other positions (R, N, D . . . ).

An electric motor with a transmission is advantageously used as actuator drive. But it is also possible to use a hydraulic or pneumatic cylinder.

Further, it is advantageous to couple the electric motor with a self-locking worm gear unit so that the gear unit acts on the four-bar linkage transmission. This is required for reducing the rotational speed of the electric motor.

Instead of the four-bar linkage transmission, the invention can also be realized by other gear units with transmission ratios that are not constants, e.g., planetary gear units, toothed rack gear units or conical gear units. This makes it possible to transmit high forces to the automatic transmission with the low-output drive in favor of a long path.

In the simplest case, the four-bar linkage transmission comprises two cranks, wherein one crank is arranged at the automatic transmission and the other crank is arranged at the actuator drive. The cranks are fixedly connected with the shafts of the transmission. The crank arranged at the automatic transmission is larger than the crank at the actuator drive. The two cranks are connected with one another by a coupling rod which is constructed with play.

In the simplest construction, the play of the coupling rod can be achieved in that an elongated hole is arranged at the coupling rod, a pin of a crank engaging in this elongated hole. However, it is also possible to use claws which engage with one another and which have play relative to one another, so that a retardation or play is brought about. Another step for achieving play would comprise a play element at any part between the actuator drive and transmission.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PREFERRED EMBODIMENTS

Figure 1:
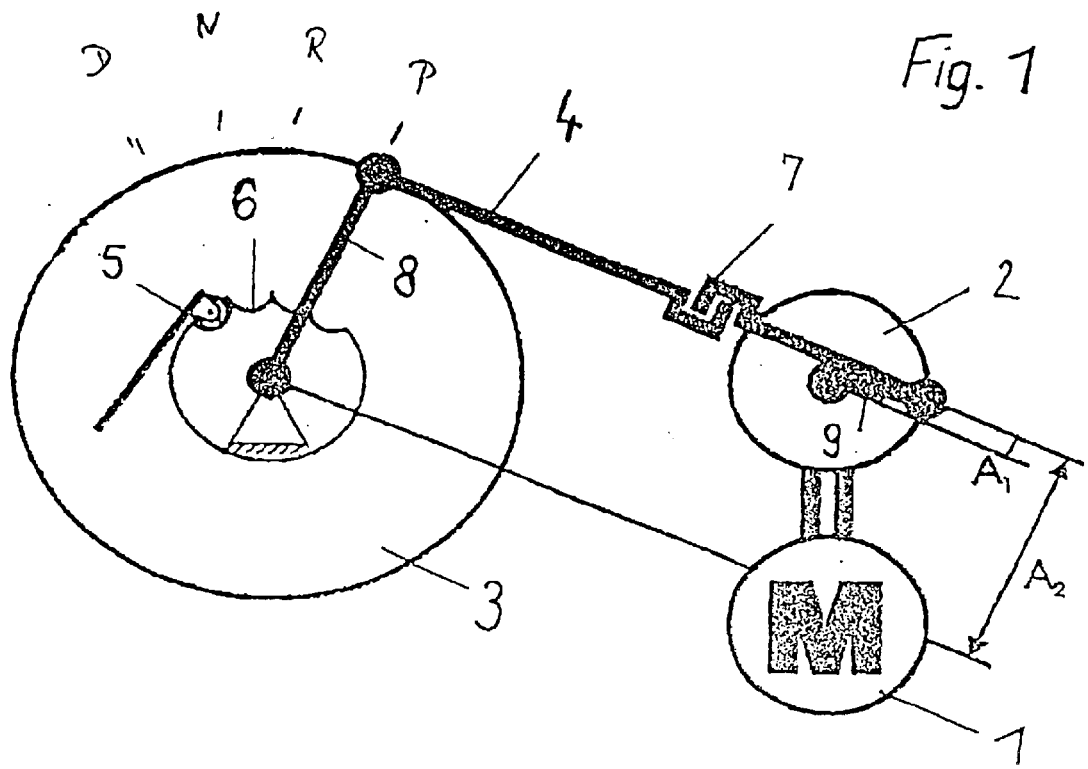
FIG. 1 is a schematic view showing an actuator of an automatic transmission in a position in which the coupling rods and the cranks are located at the worm gear unit close to a dead center.

FIG. 1 shows the actuator of an electric actuating device of an automatic transmission according to the invention, whose electric drive 1 comprises a relatively small motor 1 which does not have a very high output. This motor 1 is coupled with the self-locking worm gear unit 2. The vehicle which is in the parked position and which has been parked on a slope has exerted a force on the transmission, in the present case on the automatic transmission 3, due to the descending force of the slope. Because of the inclined position, a high force is required after parking to remove the detent from the parking ratchet wheel again. The four-bar linkage transmission is designed in such a way that the cranks 8, 9 at the automatic transmission 3 and at the worm gear unit 2 are rotated relative to one another via the coupling rod 4 in the parked position such that the coupling rod 4 assumes a very acute angle with the crank 9 at the worm gear unit 2. The lever ratios between A1 and A2 are accordingly very high, so that a distinctly small force is required to move the automatic transmission 3 with the electric motor 1 for shifting from the "P" position of the shift lever into another position. Locking cams 6 with a catch mechanism 5 are located at the automatic transmission 3. The four-bar linkage transmission comprising the two cranks 8, 9 and the coupling rod 4 has a variable transmission ratio for reasons relating to the system, wherein the coupling rod 4 has two parts which are connected by a claw 7 having play which allows the catch mechanism 5 to catch in the locking cams 6 also in intermediate positions.

Figure 2:
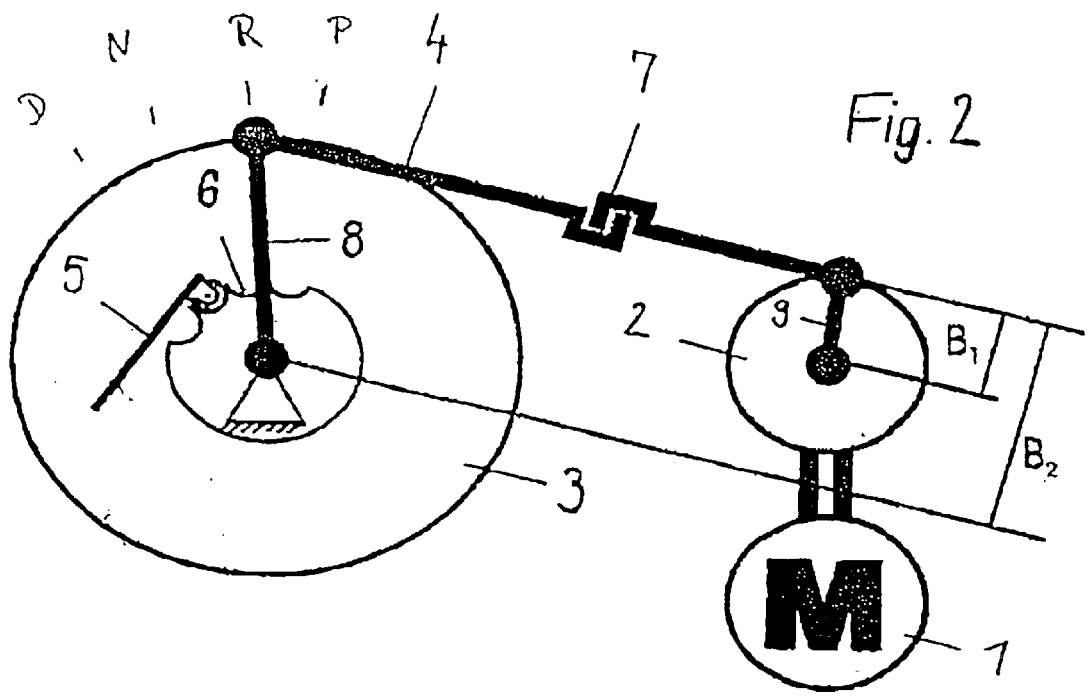
FIG. 2 shows an actuator of an automatic transmission in a position in which the dead center has been overcome.

When a selection lever, not shown, is actuated from the "P" position to another shifting position, the electric motor 1 is put into operation for actuation of the automatic transmission 3 and, with the help of the worm gear unit 2, moves the crank 9 and, therefore, the crank 8 at the gear unit 3 via the coupling rod 4 into another position, namely, the selected position (FIG. 2). The actuating forces of the automatic transmission are substantially smaller in the R, N and D positions. The transmission ratio B1 to B2 accordingly becomes increasingly smaller so that the actuating speed increases. The catch mechanism 5 of the transmission 3 is utilized for exact positioning. Due to the fact that the coupling rod 4 of the four-bar linkage has play, the transmission 3 can lock into positions without movement of the drive 1.

The actuator according to the invention for electrical actuation for an automatic transmission allows faultless shifting of the vehicles in driving operation as well as when parking up to an inclination of 30 percent.

Figure 3:
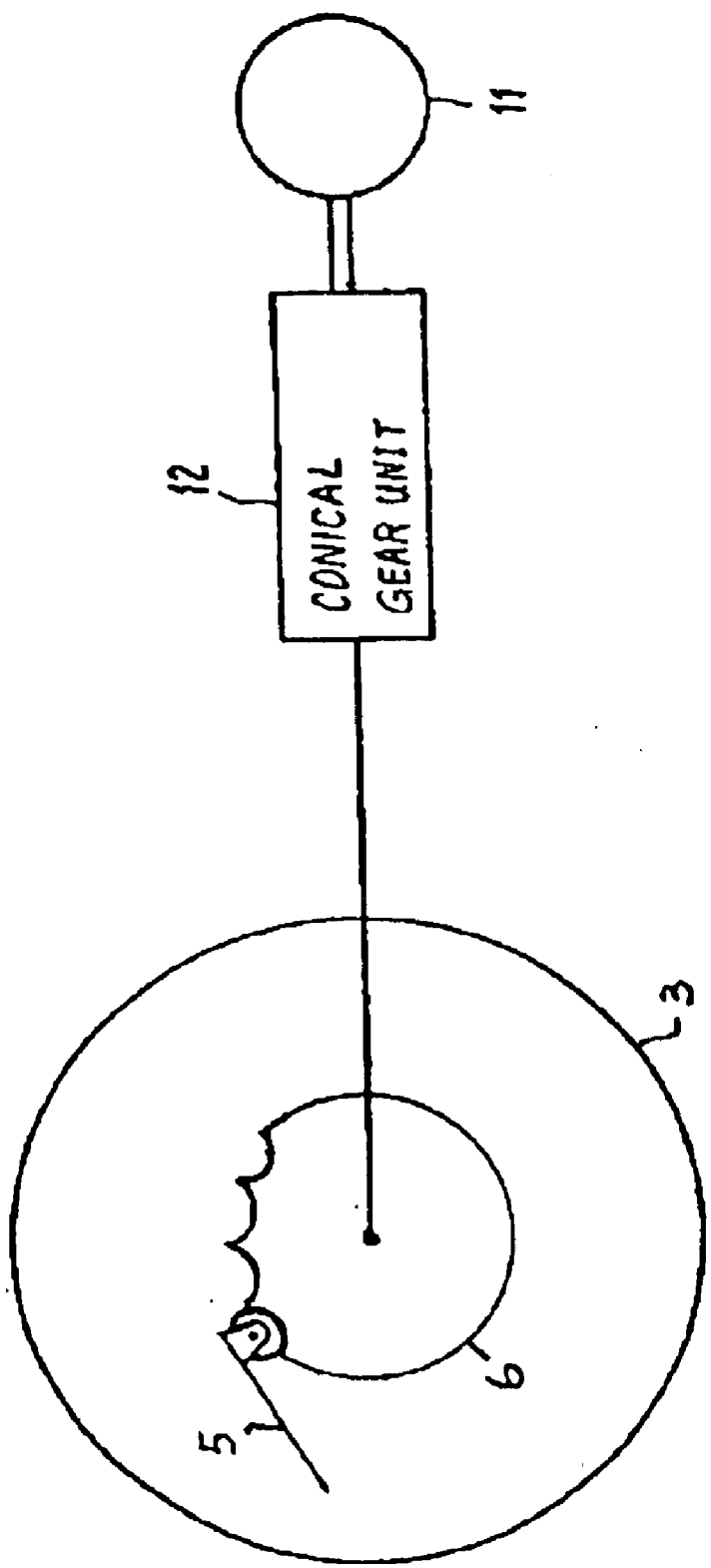
FIG. 3 is a schematic view of another embodiment of the present invention in the position of FIG. 1.

FIG. 3 shows a further embodiment of the present invention in which the transmission is a conical gear unit and the drive is a hydraulic drive. In this embodiment, a hydraulic motor 11 is connected to a conical gear unit 12 for moving the cams 6 of the transmission 3 for shifting the gears of the transmission 3.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

I claim:

1. An actuator for an automatic transmission provided with electrical actuation and an activating shaft, comprising:
   a drive; and
   a transmission with a variable transmission ratio between the drive and the automatic transmission, wherein said transmission comprises a conical gear unit.

2. An actuator according to claim 1, wherein the drive is an electric motor.

3. An actuator according to claim 1, wherein the drive is a pneumatic cylinder.

4. An actuator according to claim 1, wherein the drive is a hydraulic cylinder.

5. An actuator according to claim 1, wherein the transmission is constructed to have play.

* * * * *